Figure 1:
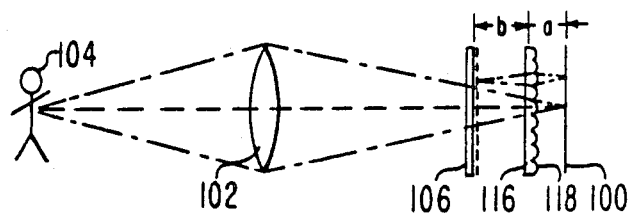

United States Patent [19]

Knop

[11] Patent Number: 4,546,380

[45] Date of Patent: Oct. 8, 1985

[54] SOLID-STATE COLOR-ENCODING TELEVISION CAMERA

[75] Inventor: Karl H. Knop, Zurich, Switzerland

[73] Assignee: RCA Corporation, Princeton, N.J.

[21] Appl. No.: 526,088

[22] Filed: Aug. 24, 1983

[51] Int. Cl.⁴ .................... H04N 9/04; H04N 9/07; H04N 9/09

[52] U.S. Cl. ...................... 358/43; 358/44; 358/55

[58] Field of Search ................ 358/41, 44, 43, 55

[56] References Cited

U.S. PATENT DOCUMENTS 4,032,976  6/1977  Levine ..................... 358/213
4,318,123  3/1982  Knop ....................... 358/43

Primary Examiner—John C. Martin
Assistant Examiner—Randall S. Svihla
Attorney, Agent, or Firm—Joseph S. Tripoli; George E. Haas; George J. Seligsohn

[57] ABSTRACT

An image of periodic color-filter stripes derived by a periodic lenticular array is made to coincide with a periodic pattern of discrete solid-state light cells of an imager, despite manufacturing tolerance errors in the values of the respective periods of the filter and array with respect to the value of the period of the imager. This is accomplished by angularly displacing each of the respective axes of the periods of the filter and imager, with respect to the axis of the period of the array, by a calculable amount.

2 Claims, 6 Drawing Figures

SOLID-STATE COLOR-ENCODING TELEVISION CAMERA

This invention relates to an improved structure for a solid-state color-encoding television camera of the type that includes a solid-state imager comprised of a periodic spatial pattern of discrete light-sensing cells, a periodic color-encoding filter, and a lenticular array comprised of periodic lenslets.

Reference is made to my U.S. Pat. No. 4,318,123, issued Mar. 2, 1982, which discloses this type of solid-state, color-encoding television camera. As disclosed in this patent, the filter includes a periodic color-encoding pattern (such as color stripes). The lenticular array, which is situated between the color-encoding filter and the imager, is required to image the color stripes (or other periodic color-encoding pattern) of the filter directly on the imager so that the image period of the color stripes exactly coincides with a given spatial period of the pattern of light-sensing cells of the imager. This requirement is met when the respective values of the distance of the lenticular array from the imager, the distance of the lenticular array from the filter, the filter period, the lenticular array period, and the given spatial period of the imager periodic spatial pattern of light-sensing cells are interrelated in the manner taught by my U.S. Pat. No. 4,318,123. However, the validity of the interrelationships taught in my U.S. Pat. No. 4,318,123 presuppose that the respective periods of the filter, the array, and the imager are all angularly oriented parallel to the same given spatial axis. This is desirable because optimum image resolution occurs at this orientation.

Ideally, a solid-state, color-encoding television camera could be constructed in accordance with the respective values of the filter period, the lenticular-array period, and the imager period taught by the relationships disclosed in my U.S. Pat. No. 4,318,123. However, in practice, each of the imager, the color-encoding filter, and the lenticular array is separately fabricated, using significantly different materials and significantly different manufacturing techniques from one another. Therefore, it is not possible, in practice, to achieve exactly the values of the imager spatial period, the color-encoding filter period, and the lenticular-array period specified by the relationships taught in my aforesaid patent. Consequently, the lenticular array produces an image of the filter stripe period on the imager in which the size of the image period is slightly different from the size of a given spatial period of the imager spatial pattern of light-sensing cells. This results in a cumulative phase displacement misalignment between the color-encoding image stripes and successive periods of the light-sensing cell spatial pattern of the imager that adversely affects the color characteristics of a television picture derived from such a solid-state, color-encoding television camera. This problem is obviated by the present invention.

More specifically, both the solid-state, color-encoding television cameras of the present invention and of my aforesaid patent include substantially similar solid state imagers, periodic color-encoding filters, and lenticular arrays. Further, each of these cameras includes an objective lens situated at a distance from the imager thereof for imaging light of wavelength λ from a scene on the light-sensing cells of the imager. However, in accordance with the present invention, the given spatial period $p_0$ of the set of a predetermined plural number of contiguous light-sensing cells of the periodic spatial pattern of the solid state imager is oriented substantially parallel to a first axis, the periodic color-encoding filter has a given spatial period s and is oriented substantially parallel to a second axis, and the periodic lenslets of the lenticular array have a given spatial period r and are oriented substantially parallel to a third axis, wherein (1) the second axis is rotated in a first direction through an angle β with respect to the third axis, (2) the first axis is rotated in a second direction opposite to the first direction through an angle α (the ratio of angle α to angle β being substantially equal to the ratio of distance a between the lenticular array and the imager to the distance b between the lenticular array and the filter), and (3) the respective values of β, $p_0$, s, and r, are so related that cos β is substantially equal to $\frac{1}{2}(r/s + s/r - rs/p_0^2)$ and $1/r - 1/s < 1/p_0$. Further, β is in the range of $0 < \beta p_0 \leq \lambda F_0$ (where $F_0$ is the value of f-number of the objective lens). By selecting a value for the angle β which conforms to these quantitative constraints, the image of the periodic color-encoding filter on the solid state imager then has a given spacing period p that is substantially congruent to the given spatial period $p_0$ of the periodic spatial pattern of light-sensing cells of the solid state imager.

Figure 1A:
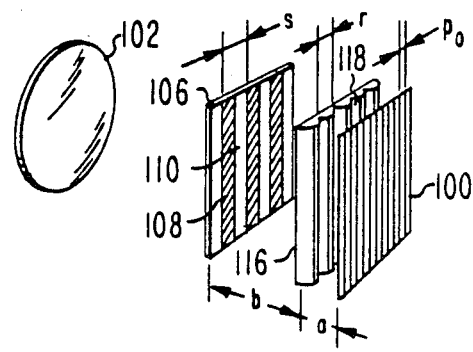
Figure 2:
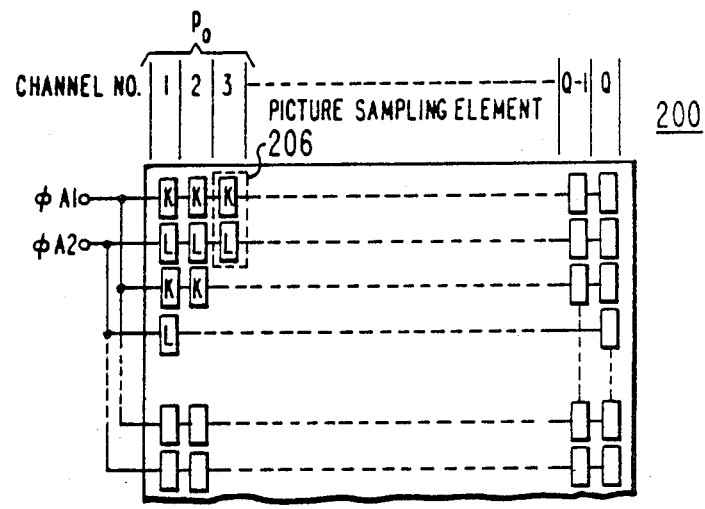
Figure 3:
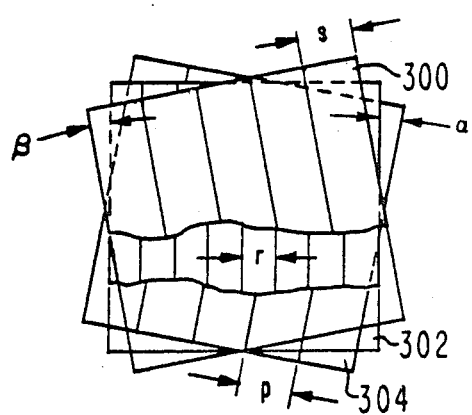
Figure 3A:
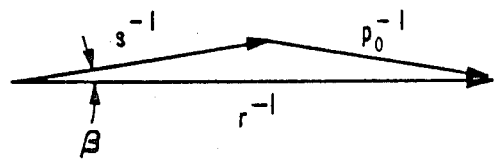
Figure 4:
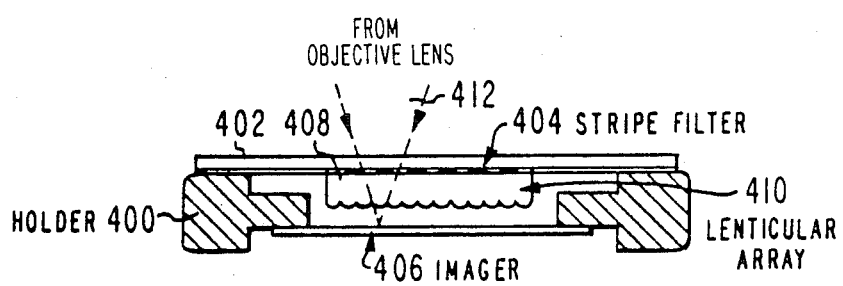

In the drawings:

FIGS. 1 and 1a diagramatically illustrate the relationships among the objective lens, the color-encoding filter, the lenticular array, and the solid-state imager of the television camera disclosed in my aforesaid U.S. Pat. No. 4,318,123;

FIG. 2 is a schematic diagram of one example of a solid-state imager;

FIG. 3 diagramatically illustrates the relative angular orientation of color-encoding stripe filter, the lenticular array, and the stripe image of the filter produced by the lenticular array, in accordance with the principles of the present invention;

FIG. 3a is a vector diagram illustrating the quantitative spatial relationships among the respective spatial periods of the filter, the lenticular array, and the filter image of FIG. 3; and FIG. 4 illustrates an embodiment of a support-assembly structure for the filter, lenticular array, and solid-state imager of a television camera incorporating the present invention.

Referring to FIGS. 1 and 1a, a solid-state, color-encoding television camera, both of the type incorporating the present invention and of the type disclosed in my aforesaid patent, U.S. Pat. No. 4,318,123, includes solid-state imager 100 comprised of a periodic spatial pattern of discrete light-sensing cells. Solid-state imager 100 may take the form of the charge-coupled device (CCD) imager shown in FIG. 2, discussed in more detail below. Objective lens 102, which is situated at a distance from imager 100 and which has an f-number $F_0$ images light from an external scene (such as 104) on imager 100. The image light includes a given optical wavelength λ.

Periodic color-encoding filter 106 is situated between objective lens 102 and imager 100 at a distance (a+b) from imager 100 in both the present invention and in my aforesaid patent. Each period s of periodic color-encoding filter 106 is divided into a plurality of vertical color stripes. In the particular case of FIG. 1a, each period of color-encoding filter 106 is divided equally into a stripe of a given color hue 108 and a clear stripe 110. Thus, in the case of filter 106 the colored stripes 108 occur with a duty cycle δ of one-half. Because this stripe-pattern is one of the simplest pattern arrangements for a periodic color-encoding filter, it is shown by way of example in FIGS. 1 and 1a. However, other types of pattern arrangements may be employed for a periodic color-encoding filter.

For instance, my aforesaid U.S. Pat. No. 4,318,123 discloses a slightly more complex preferred embodiment of a striped pattern for a periodic color-encoding filter for use in a solid-state color-encoding television camera, in which the period s of the color-encoding filter is divided into three separate vertical color stripes, each of a different one of the three primary colors. The three primary colors may be the additive primary colors, red, green, and blue, or, alternatively, the subtractive primary colors, cyan, magenta, and yellow, or any combination of these colors and white which allows the extraction of the basic red, green, and blue content of the picture. Each of the three color stripes of a period of this preferred embodiment may have an equal width to provide a duty cycle δ of one-third for each color. Alternatively, one or more of the color stripes may have a duty cycle which is different from one or more other color stripes, to compensate for differences in sensitivity of the solid-state imager to different ones of the colors.

For illustrative purposes in describing the present invention, it is assumed that each period s of the color-encoding filter is divided into three primary colors, each having a duty cycle δ of one-third. An example of a solid-state imager 100, which is suitable for use with such a color-encoding filter, is shown in FIG. 2. FIG. 2 schematically illustrates a CCD imager of the field transfer type (sometimes termed an imager of the "frame" transfer type) that is known in the art, and by way of example, is described in some detail in U.S. Pat. No. 4,032,976 which issued to P. A. Levine on June 28, 1977.

Briefly, as shown in FIG. 2, imager 200 is divided into Q separate channels numbered 1 ... Q, extending vertically in a column direction. Each pair of adjacent electrodes K and L of each respective channel defines a discrete picture sampling element (shown as a dashed rectangle 206 in FIG. 2). The electrodes K and L of each discrete picture sampling element, constitute two-phase structures for ensuring signal propagation in response to applied clock voltages $\phi A_1$ and $\phi A_2$, in a manner known in the CCD art.

As indicated in FIG. 2, CCD solid-state imager 200 is comprised of a periodic spatial pattern of discrete light-sensing cells (i.e., picture sampling elements 206). In order to achieve a high-resolution television picture from a solid-state imager, such as imager 200, the dimensions of each picture sampling element must be quite small. For instance, each picture sampling element 206 of imager 200 has a typical width of about 30 micrometers. Furthermore, each discrete picture sampling element 206 integrates the light impinging thereon over its entire sub-area of imager 200. Therefore, in order to maintain high resolution in a television picture derived from imager 200, the optics of the television camera of which imager 200 is part, must be capable of producing a relatively sharp image of a scene on imager 200, which image is properly aligned with the spatial pattern of discrete picture sampling elements 206. For instance, in one particular encoding scheme, it is necessary to image the three primary color stripes of periodic color-encoding filter on imager 200 so that primary color 1 is imaged on channels 1, 4, 7, ... ; primary color 2 is imaged on channels 2, 5, 8, ... ; and primary color 3 is imaged on channels 3, 6, 9, ... Thus, the periodic spatial pattern of the discrete light-sensing cells includes a given spatial period $p_0$ of a set of a predetermined plural number (three, in the case of FIG. 2) of contiguous light-sensing cell channels corresponding to the period s of the color-encoding filter (the desired period between the image of any one of the three primary colors in the case of FIG. 2).

Returning to FIGS. 1 and 1a, lenticular array 116, comprising periodic cylindrical lenslets 118, is situated at a distance a from imager 100 and at a distance b from color-encoding filter 106. Periodic lenslets 118 have a period of r in correspondence with the period s of the filter (i.e., the ratio of r to s is a constant, although there need not be one lenslet for each and every period of the color filter). The angular orientation of the filter, array, and imager of the prior art camera disclosed in my aforesaid patent is that shown in FIGS. 1, 1a and 2, in which the spatial axes of color-encoding filter 106, lenslets 118 of lenticular array 116, and the channels of imagers 100 and 200 are all oriented substantially parallel to a vertical axis. Each of lenslets 118 exhibits a focal length f such that when array 116 occupies the position shown (i.e., an image distance a from imager 100 and an object distance b from filter 106), the stripes of each period s of the filter are imaged on imager 200 with an image-stripe spatial period p. As is known in optics, such an image of the filter stripes on the imager exhibits a magnification m equal to b/a. This results in the spatial period p of the image of the periodic filter on the imager being equal to s/m. Each period p on the imager contains an image of all the color stripes in one period s of the filter. Therefore, in the particular encoding scheme described above in connection with FIG. 2 (where each of three primary colors are imaged on the imager), the period p of an image of one period s of the color-encoding filter should cover substantially exactly the given spacing period $p_0$ of the imager. Therefore, in the case described above, in which the width of each imager channel is 30 μm, both the image spatial period p and the spatial period $p_0$ of the imager must be exactly 90 μm in order for each of the respective image color stripes to coincide in position with the discrete light cells of a corresponding one of the respective channels of the imager.

The problem is that the solid-state imager (such as the CCD imager chip shown in FIG. 2), the periodic color-encoding filter, and the lenticular array of periodic lenslets are typically separately fabricated employing different materials and different manufacturing techniques that have different manufacturing tolerances. This results in a slight disparity between the actual and ideal design values of the spatial period s of the color-encoding filter and the spatial period s of the lenticular array with respect to the spatial period $p_0$ of the imager.

The overall effective width of channels 1 ... Q in FIG. 2 of the imager includes a large number of spatial periods $p_0$. Therefore, although the disparity between the spatial period p of the color stripe image and the given spatial period $p_0$ of the imager is small, the cumulative phase displacement over the effective width of the imager can be substantial with respect to the size of the spatial period $p_0$ of the imager. Thus, if the color stripe image is properly aligned with channel 1 of the imager, the color stripe image will be substantially out of alignment with the imager channel Q of the imager (and vice-versa). This misalignment degrades the television picture derived from the imager.

The present invention is directed to a technique for achieving a color stripe image period p that is substantially equal to the imager spatial period $p_0$, despite a slight unavoidable disparity in the actual values of the respective periods s of the color-encoding filter and r of the lenticular array from their ideal design values.

In one practical example, where the magnification m is unity (a=b) and both the design and actual values of $p_0$ are substantially 90 μm, the respective ideal values of s and r are 90 μm and 45 μm. In this case, the ideal value of the angle $\beta$ is equal to zero.

However, due to manufacturing tolerances, these ideal values cannot be exactly achieved. In accordance with the principles of the present invention, the design values of s and r are chosen close to the ideal values of s and r, but with the constraint that, despite manufacturing tolerances, the difference between the respective reciprocals of r and s must always be less than the reciprocal of $p_0$. For instance, in the aforesaid practical example, the actual values of s turned out to be 89.863 μm and the actual value of r turned out to be 44.978 μm.

As indicated in FIG. 3, the technique of the present invention involves rotating a periodic color-encoding filter 300, having a spatial period s, in a given direction through an angle $\beta$ with respect to lenticular array 302, having a spatial period r. This results in the filter image on the imager, having a spatial period p, being rotated in a direction opposite to the given direction through an angle $\alpha$, in which $\alpha$ is equal to $a\beta/b$. Therefore, in the above practical example, in which a and b are equal to one another, $\alpha=\beta$. It is thus seen that in the camera arrangement of the present invention, the spatial period s is oriented substantially parallel to a different axis from the axis of the given spatial period r of the lenticular array. This differs from the prior-art arrangement, shown in FIGS. 1 and 1a, in which the respective given spatial periods s and r of the filter and lenticular array are both oriented substantially parallel to the same (i.e., vertical) axis.

The quantitative effect on the size of the image spatial period p is indicated by the vector diagram shown in FIG. 3a, in which the vector corresponding to the quantity 1/s is rotated through the angle $\beta$ with respect to the vector corresponding to the quantity 1/r. The vector diagram of FIG. 3a indicates that 1/r is equal to the vector sum of 1/s+1/p. Since the respective values of r and s are fixed actual values, 1/p must have a value equal to the vector difference of 1/r−1/s. Thus, as can be seen from FIG. 3a, the value of p varies as a function of the rotation angle $\beta$ between filter 300 and array 302. More specifically, the size of 1/p becomes larger (and hence p becomes smaller) as the angle $\beta$ becomes larger. Therefore, 1/p will have its smallest value (and hence p will have its largest value) in the prior-art case shown in FIGS. 1 and 1a in which filter 300 and lenticular array 302 are aligned with one another ($\beta=0$). In this prior-art case, the period p of the image stripe pattern 304 is given by the following algebraic equation taught in my aforesaid patent:

$$1/p = 1/r - 1/s \tag{1}$$

However, in the more general case shown in FIG. 3, in which $\beta$ may have a value greater than zero, the value of p, as calculated from the vector diagram of FIG. 3a, is as follows:

$$p = sr/(s^2 + r^2 - 2sr \cos \beta)^{\frac{1}{2}} \tag{2}$$

Equation (2) simplifies to equation (1) when $\beta$ is equal to zero. More importantly, equation (2) may be employed for computing that particular value of $\beta$ for which the image stripe period p is exactly equal to the given spatial period $p_0$ of the imager. The real solution of equation (2), which defines this particular value of $\beta$, is given by the following equation:

$$\cos \beta = \tfrac{1}{2}(r/s + s/r - rs/p_0^2) \tag{3}$$

In order for equation (2) to have the real solution shown in equation (3), it is essential that the respective values of r and s be chosen, as in the prior art, such that $1/r - 1/s = 1/p_0$ or, as in the present invention, such that the following relationship applies:

$$1/r - 1/s < 1/p_0 \tag{4}$$

In relationship (4), for the case in which $\beta>0$, the chosen value of lenticular array period r must be slightly larger and/or the chosen value of the filter period s must be slightly smaller than the respective values of r and s that would be chosen to satisfy equation (1) for the prior-art case in which $\beta=0$.

There is one more constraint that must be taken into consideration that limits the maximum permissible value of the angle of rotation $\beta$. It is essential that the stripes be imaged on the imager with a resolution sufficiently sharp to substantially minimize optical cross-talk. Optimum resolution is obtained only for the prior-art case in which the axes of the filter and the lenticular array are in parallel ($\beta=0$). However, any loss in resolution remains tolerable (i.e., does not objectionably degrade the sharpness of a television picture derived from the imager) for a rotation angle greater than zero so long as the rotation angle is sufficiently small to conform to the following relationship, where $F_0$ is the f-number of the objective lens:

$$0 < \beta p_0 \leq \lambda F_0 \tag{5}$$

Referring to FIG. 4, there is shown a support assembly comprising a holder 400, which is attached to transparent rigid member 402 that includes stripe filter 404. Imager 406 (which may be a CCD imager of the type shown in FIG. 2). is also attached to holder 400. Attached to and supported by member 402 is a transparent member 408 including lenticular array 410. As indicated in FIG. 4, lenticular array 410 is situated in cooperative spatial relationship with stripe filter 404 at respective fixed distances from stripe filter 404 and imager 406. A scene is imaged by an objective lens (not shown) on imager 406 (as indicated by converging light beam 412, which passes through stripe filter 404 and lenticular array 410 before being focused on imager 406). In accordance with the principles of the present invention, the respective axes of the spatial periods of stripe filter 404 and of imager 406 are rotated with respect to the axis of the spacing period of lenticular array 410 during assembly, and before final gluing, of these elements to the support structure shown in FIG. 4, to provide precisely the proper preselected angular displacements $\beta$ and $\alpha$ therebetween. In particular, the respective angular positions of stripe filter 404, lenticular array 410, and imager 406 in FIG. 4 correspond to the respective angular positions of filter 300, lenticular array 302, and image 304 shown in FIG. 3. Since the angular position of imager 406 corresponds to that of image 304, and, in accordance with the principles of the present invention, the angle $\beta$ has been chosen to make the image period p equal to the given spatial period $p_0$ of imager 406, image pattern 304 will substantially coincide with the periodic spatial pattern of light sensing cells over the entire area of imager 406.

For instance, in the above-discussed practical example (in which $p_0 = 90$ μm, $s = 89.863$ μm, and $r = 44.978$ μm), a rotation angle $\beta$ of 1.34° between the filter and the lenticular array provides a periodic image pattern which coincides with and is congruent to the given spatial pattern of light sensing cells of the imager to within one part in ten thousand. Further, this rotation angle of 1.34°, which is computed from the respective known values of r, s, and $p_0$, utilizing above-set-forth equation (3), results in a loss in sharpness of the image of the stripes that is so small that it does not affect the performance of the television camera. The fact that the periodic image pattern and the pattern of light cells of the imager are matched within one part in ten thousand yields excellent color uniformity of the television picture derived from the imager.

What is claimed is:

1. A solid-state, color-encoding television camera including:

a solid state imager comprised of a periodic spatial pattern of light-sensing cells, said pattern including a given spatial period $p_0$ of a set of a predetermined plural number of contiguous light-sensing cells, said spatial period $p_0$ being oriented substantially parallel to a first axis;

an objective lens situated at a distance from said imager for imaging light of wavelength $\lambda$ from a scene on said cells of said imager, said objective lens having an f-number $F_0$;

a periodic color-encoding filter having a given spatial period s that is an integral proportion of said given spatial period $p_0$, said given period s being comprised of a plurality of different colors each of which corresponds to a separate element of said set of a predetermined plural number of contiguous light-sensing cells, said given spatial period s being oriented substantially parallel to a second axis, and said filter being situated between said objective lens and said imager at a distance (a+b) from said imager; and a lenticular array comprising periodic lenslets having a given spatial period r that is a given proportion of said given spatial period s of said filter, said given spatial period r being oriented substantially parallel to a third axis, and said array being situated at said distance (a) from said imager and at said distance (b) from said filter;

wherein (1) said second axis is rotated in a first direction through an angle $\beta$ with respect to said third axis, (2) said first axis is rotated in a second direction opposite to said first direction through an angle $\alpha$ substantially equal to $a\beta/b$ with respect to said third axis, and (3) the respective values of $\beta$, $F_0$, $\lambda$, $p_0$, s and r are so related that $\beta$ is in the range of $0 < \beta p_0 \leq \lambda F_0$, and $\cos \beta$ is substantially equal to $\frac{1}{2}(r/s + s/r - rs/p_0^2)$, and $1/r - 1/s < 1/p_0$.

2. The television camera defined in claim 1, further including a support assembly for holding said imager, said filter, and said lenticular array in fixed spatial relationship with respect to one another with (A) said array being situated between said imager and said filter at said distance (a) from said imager and at said distance (b) from said filter, and (B) said second axis being rotated said angle $\beta$ with respect to said third axis and said first axis being rotated said angle $\alpha$ with respect to said third axis.

* * * * *